United States Patent
Black et al.

(10) Patent No.: US 10,007,682 B2
(45) Date of Patent: Jun. 26, 2018

(54) DYNAMICALLY MAINTAINING DATA STRUCTURES DRIVEN BY HETEROGENEOUS CLIENTS IN A DISTRIBUTED DATA COLLECTION SYSTEM

(71) Applicant: International Business Machines Corporation, Armonk, NY (US)

(72) Inventors: Jeffrey D. Black, Kingston, TN (US); Alfredo Cortes, London (CA); Tracy A. Fletcher, Cary, NC (US); Steven J. Lee, Cary, NC (US); Sharon Saadia, Fairfax, VA (US); Wendy C. Sechler, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 14/673,512

(22) Filed: Mar. 30, 2015

(65) Prior Publication Data

US 2016/0292186 A1    Oct. 6, 2016

(51) Int. Cl.
*G06F 17/30* (2006.01)
*H04L 29/08* (2006.01)
(Continued)

(52) U.S. Cl.
CPC .. *G06F 17/30294* (2013.01); *G06F 17/30563* (2013.01); *G06F 17/30592* (2013.01);
(Continued)

(58) Field of Classification Search
CPC .......... G06F 17/2264; G06F 17/30557; G06F 17/30563; G06F 17/30578;
(Continued)

(56) References Cited

U.S. PATENT DOCUMENTS 5,485,606 A   1/1996  Midgdey et al.
5,721,916 A   2/1998  Pardikar
(Continued)

FOREIGN PATENT DOCUMENTS

WO       9513582       5/1995

OTHER PUBLICATIONS

Mell, P. and T. Grance, "Effectively and Securely Using the Cloud Computing Paradigm", NIST, Information Technology Laboratory, Oct. 7, 2009, Total 80 pp.
(Continued)

*Primary Examiner* — Dennis Truong
(74) *Attorney, Agent, or Firm* — Janaki K. Davda; Konrad, Raynes, Davda & Victor LLP

(57) ABSTRACT

Provided are techniques for dynamically maintaining data structures driven by heterogeneous clients in a distributed data collection system. In response to determining that a client-specific data structure has been modified in a source coupled to each of a plurality of clients, a metadata specification is generated, at each of the plurality of clients, from data structure metadata that includes attributes of the client-specific data structure; and data driven structure definitions are generated, at each of the plurality of clients, from the metadata specification, wherein the data driven structure definitions from each of the plurality of clients are to be aggregated to form a common data model in a central server.

15 Claims, 12 Drawing Sheets

(51) Int. Cl.
*H04W 4/60* (2018.01)
*H04W 4/00* (2018.01)

(52) U.S. Cl.
CPC ............ *H04L 67/10* (2013.01); *H04W 4/003* (2013.01); *H04W 4/60* (2018.02)

(58) Field of Classification Search
CPC ......... G06F 17/30294; G06F 17/30569; H04L 67/2823; H04L 67/10; Y10S 707/99942; H04W 4/003
USPC ........................ 707/602, 756, 802; 709/246
See application file for complete search history.

(56) References Cited

U.S. PATENT DOCUMENTS

| | | | |
|---|---|---|---|
| 5,819,296 A | 10/1998 | Anderson et al. | |
| 6,003,044 A | 12/1999 | Pongracz et al. | |
| 7,010,538 B1* | 3/2006 | Black ................ | G06F 17/30516 707/636 |
| 7,386,566 B2 | 6/2008 | Howey et al. | |
| 8,255,186 B2 | 8/2012 | Mukhi et al. | |
| 8,612,394 B2 | 12/2013 | Prahlad et al. | |
| 9,105,000 B1* | 8/2015 | White ............... | G06F 17/30303 |
| 2005/0066058 A1* | 3/2005 | An ........................ | H04L 29/06 709/246 |
| 2006/0242160 A1* | 10/2006 | Kanchwalla ...... | G06F 17/30592 |
| 2007/0165625 A1* | 7/2007 | Eisner ................... | G06F 9/546 370/389 |
| 2012/0005151 A1 | 1/2012 | Vasudevan et al. | |
| 2012/0089562 A1* | 4/2012 | Deremigio ........ | G06F 17/30563 707/602 |
| 2012/0203790 A1* | 8/2012 | Cariri ................. | G06F 17/30557 707/756 |
| 2012/0239703 A1* | 9/2012 | Blight ............... | G06F 17/30566 707/802 |
| 2012/0271914 A1 | 10/2012 | Jiang et al. | |
| 2013/0275363 A1* | 10/2013 | Wu ........................... | G06F 9/46 707/602 |
| 2014/0040182 A1* | 2/2014 | Gilder ............... | G06F 17/30578 707/602 |
| 2014/0067836 A1* | 3/2014 | Holmes ............. | G06F 17/30554 707/756 |
| 2014/0081483 A1 | 3/2014 | Weinmann et al. | |
| 2014/0108437 A1* | 4/2014 | Brown ............. | G06F 17/30563 707/755 |
| 2014/0372462 A1* | 12/2014 | Leahy Wise ...... | G06F 17/30569 707/756 |

OTHER PUBLICATIONS

Mell, P. and T. Grance, "The NIST Definition of Cloud Computing (Draft)", National Institute of Standards and Technology, Jan. 2011, Total 7 pp.

Rajasekar, A., R. Marciano, and R. Moore, "Collection-Based Persistent Archives", San Diego Supercomputer Center, © 1999 IEEE, Total 9 pp.

* cited by examiner

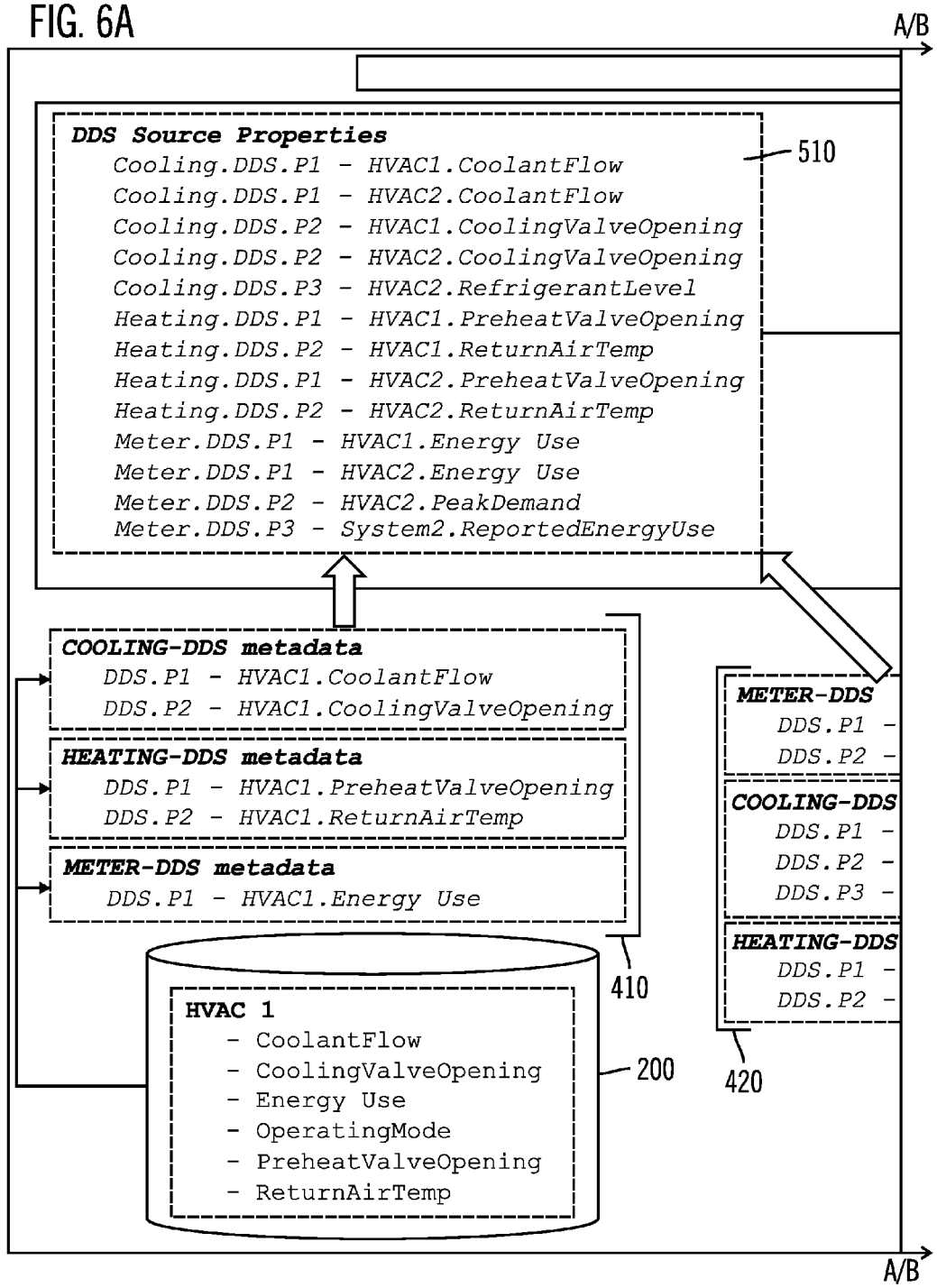

DYNAMICALLY MAINTAINING DATA STRUCTURES DRIVEN BY HETEROGENEOUS CLIENTS IN A DISTRIBUTED DATA COLLECTION SYSTEM

FIELD

Embodiments of the invention relate to dynamically maintaining data structures driven by heterogeneous clients in a distributed data collection system.

BACKGROUND

There is a challenge for data model extensibility of distributed data collection systems. A data model may be described as a conceptual representation of data structures required by a system. Data model extensibility is a characteristic of a data model and defines the extent to which the data model's logical design is capable of incorporating additional attributes to existing data structures. Distributed data collection systems may be described as systems specifically developed to measure, collect, and aggregate data of interest. Distributed data collection systems distribute their dedicated data collection processing logic across different components with the objective of distributing data processing loads and providing data collecting logic specific to target data source.

Traditionally this challenge has been approached by means of data model consolidation supported in a hub-spoke model via a central server ("hub") or object catalogue that contains common data structure definitions for common data structures. With these conventional approaches, updates to a system-wide common data model are executed in the central server (hub) and subsequently propagated to all client ("spoke") components in the distributed data collection system.

This propagation mechanism forces client components to implement the common data structures that might not be related-to or assist-with their main functional role in the distributed data collection system. Additionally, a centralized data model includes dependency on design time definition and impacts client components when there are new revisions and upgrade procedures.

In certain embodiments, there is optimization of data integration in the context of Supervisory, Control and Data Acquisition systems (SCADA). With SCADA systems, there is a complexity of data structures and no standard Application Programming Interfaces (APIs) or integration protocols implemented across multiple SCADA vendors. This type of industrial control system is intended to monitor and control distributed data collection systems covering multiple sites and multiple monitored devices. To efficiently consume SCADA data, distributed data collection systems provide an effective way to extend its data model to accommodate any type of target device and its associated data structures. One way in which these integration requirements have been approached is by providing dedicated monitoring solutions geared to a particular SCADA vendor; however this limits the level of data consolidation for upper layers in the system stack and ties implementations to specific technology provider's releases.

SUMMARY

Provided is a method for dynamically maintaining data structures driven by heterogeneous clients in a distributed data collection system. The method comprises: in response to determining that a client-specific data structure has been modified in a source coupled to each of a plurality of clients, generating, at each of the plurality of clients, a metadata specification from data structure metadata that includes attributes of the client-specific data structure; and generating, at each of the plurality of clients, data driven structure definitions from the metadata specification, wherein the data driven structure definitions from each of the plurality of clients are to be aggregated to form a common data model in a central server.

Provided is a computer program product for dynamically maintaining data structures driven by heterogeneous clients in a distributed data collection system. The computer program product comprises a computer readable storage medium having program code embodied therewith, the program code executable by at least one processor to perform: in response to determining that a client-specific data structure has been modified in a source coupled to each of a plurality of clients, generating, at each of the plurality of clients, a metadata specification from data structure metadata that includes attributes of the client-specific data structure; and generating, at each of the plurality of clients, data driven structure definitions from the metadata specification, wherein the data driven structure definitions from each of the plurality of clients are to be aggregated to form a common data model in a central server.

Provided is a computer system for dynamically maintaining data structures driven by heterogeneous clients in a distributed data collection system. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: in response to determining that a client-specific data structure has been modified in a source coupled to each of a plurality of clients, generating, at each of the plurality of clients, a metadata specification from data structure metadata that includes attributes of the client-specific data structure; and generating, at each of the plurality of clients, data driven structure definitions from the metadata specification, wherein the data driven structure definitions from each of the plurality of clients are to be aggregated to form a common data model in a central server.

BRIEF DESCRIPTION OF THE SEVERAL VIEWS OF THE DRAWINGS

Referring now to the drawings in which like reference numbers represent corresponding parts throughout:

FIGS. 6A and 6B illustrate consuming applications in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
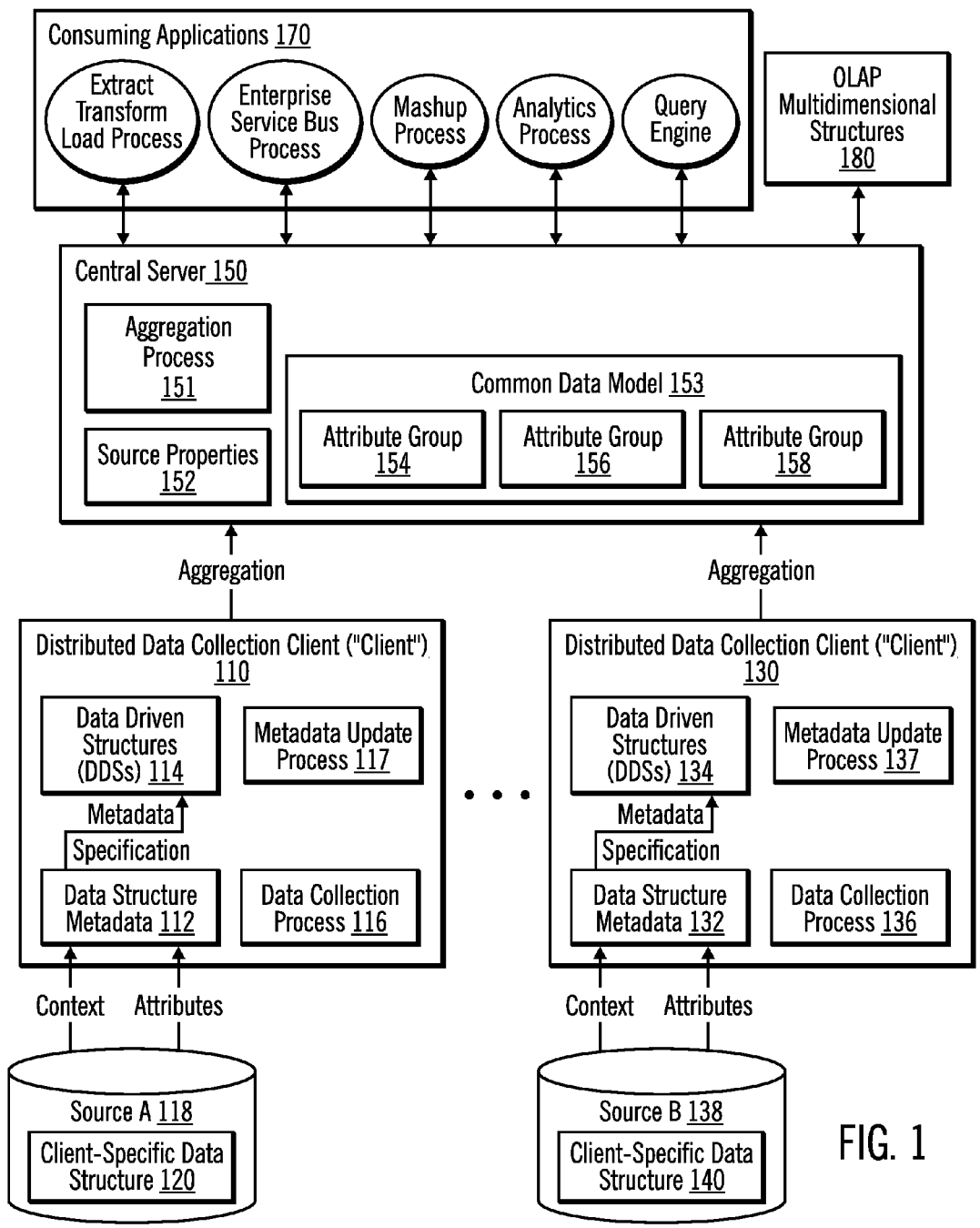
FIG. 1 illustrates, in a block diagram, a computing environment for a distributed data collection system in accordance with certain embodiments.

FIG. 1 illustrates, in a block diagram, a computing environment for a distributed data collection system in accordance with certain embodiments. A distributed data collection client ("client") 110 and a distributed data collection client ("client") 130 are coupled to a central server 150. The ellipses between clients 110 and 130 indicate that there may be any number of clients coupled to the central server 150 and that have the components shown for clients 110, 130. In certain embodiments, the central server 150 is a server computer, and each client 110 . . . 130 is a client computer. In certain embodiments, there is a hub-spoke model, and the central server 150 may be considered to be a "hub", while the clients 110 . . . 130 may be considered to be "spokes" or "spoke-level" clients. Source A 118 is coupled to client 110, while source B is coupled to client 130. Source A 118 and Source B 138 may be data stores, such as databases. The clients 110 . . . 130 may be referred to heterogeneous clients in the distributed data collection system.

Source A 118 stores client-specific data structures 120 for client 110, and Source B 138 stores client-specific data structures 140 for client 110. In certain embodiments, the client-specific data structures 120, 140 are based on different data models.

The client 110 includes data structure metadata 112, DDS definitions 114, a metadata update process 117, and a data collection process 116. The client 130 includes data structure metadata 132, DDS definitions 134, a metadata update process 137, and a data collection process 136. The data collection process 116 stores attributes and a context from source A 118 into the data structure metadata 112, and the metadata update processes 117 uses the data structure metadata 112 to generate a metadata specification, which is used to generate the DDS definitions 114. The data collection process 136 stores attributes and a context from source B 138 into the data structure metadata 132, and the metadata update process 137 uses the data structure metadata 132 to generate a metadata specification, which is used to generate the DDS definitions 134. The attributes may be referred to as metadata attributes.

The central server 150 includes an aggregation process 151, source properties 152 and a common data model 153. The central server 150 maintains a common data model 153 between the different data models of source A 118 and source B 130. The common data model 153 includes attribute groups 154, 156, 158. The central server 150 is coupled to consuming ("client") applications 170, such as an ETL process, an Enterprise Service Bus (ESB) process, a mashup process, an analytics process, and a query engine. The consuming applications 170 are coupled to Online Analytical Processing (OLAP) multidimensional structures 180. Data Analysis processing (Data Analytics) may be considered OLAP systems. In certain embodiments, the central server 150 may implement, as a common data model definition, multi-dimensional data structures that comply with a "formal" OLAP definition.

Embodiments support a metadata specification of a distributed data model that is driven by independent, client-specific data structures and associated data structure metadata that describe the independent, client-specific data structures at each of multiple clients.

Embodiments support a meta-data driven process for dynamically defining and maintaining client-specific data structures as defined by clients in a distributed data collection system.

Embodiments differentiate from conventional data model management in distributed data collection systems in that the embodiments do not require common data structure changes to be propagated from a central server to all clients in the distributed data collection system. With embodiments, no known process defines multiple distributed data collection system client-level components as the main driver for data model definition and consolidation. That is, embodiments are unlike conventional systems that rely on a centralized repository as the main driver for data model definition. Embodiments enable clients to implement just those client-specific data structures used for their functional objective and supports the mechanism in which changes at the client-level are propagated to a common data structure for consuming applications in the distributed data collection system, for example Extract Transform Load (ETL) processes, Enterprise Service Bus (ESB) processes, data mashup processes, analytics processes, and query engines.

Embodiments use data structure metadata to drive the data model definition process in the distributed data collection system. Leveraging this data structure metadata, application developers may define Data Driven Structures (DDSs) in-line with the specific data to be consumed by a particular distributed data collection system client. Attributes of the data structure metadata may enable each DDS definition to dictate:

1. Objects supported by the DDS;
2. Attributes supported by the DDS;
3. Data types supported by the DDS;
4. Processing context for objects and attributes; and
5. Conditions associated with objects and attributes that make the propagation of the DDS to other clients conditional. For example, the propagation process may verify a DDS state to determine when to propagate and other DDSs that may be considered for propagation.

Embodiments provide an aggregation process that drives the dynamic generation of a common data model based on DDS definitions. This aggregation process is supported via a scheduled execution job so that any updates on DDS definitions are automatically promoted into the distributed data collection system's common data model. Consuming applications of the distributed data collection system leverage a common data structure to process collected data according to their particular functional context. The aggregation process propagates data model changes from consuming applications to the common data model, and the consuming applications drive local updates with the aggregation process reflecting those changes in the common data mode.

Embodiments optimize implementation of an integration scenario with a SCADA system by enabling the definition of appropriate client-specific data structures at a data collection point, avoiding the implementation of fixed client-specific data structures that could potentially collect irrelevant data for that particular system client-level component. The DDSs are specific to each one of the clients directly integrating with the SCADA system, making its maintenance more efficient. For large scale implementations where multiple integration points are supported, embodiments provide an aggregation process that automatically collects new client-specific data structure information from new and/or updated DDS definitions and automatically updates each distributed data collection system's common data model so that applications looking to consume SCADA data automatically receive data model enhancements as dictated by the clients.

In the case of updates to DDS definitions, the DDS metadata includes object/attribute state information that enables the aggregation process to promote those object/attributes that have been identified as "ready to process" by consuming applications 170, hence the common data model reflects these "delta" updates as soon as the aggregation process executes. At this point, consuming applications 170 are in a position to use the updated common data model and execute a revision of their particular common data model abstraction (e.g., re-creation of OLAP multidimensional structures) or make use of the updated metadata to dynamically consume updated client-specific data structures (e.g., metadata driven ETL processes).

In certain embodiments, on a schedule, the source properties 152 in the common data model are updated to reflect the new properties added to source A 118 and source B 138.

In certain embodiments, the consuming applications 170 may read data from source A 118 and/or source B 138 between scheduled updates.

Embodiments consider the metadata aggregation process as decoupled from the data collection process. Once a consuming application updates a DDS A structure (e.g., DDS 114) with the new attribute that is to be collected from source A 118, the data collection process in client A is capable of interacting with the physical tables/attributes referenced by DDS A structure metadata. At this point, DDS A structure metadata includes the new attribute that the data aggregation process eventually promotes to the common data model.

With embodiments, metadata definitions drive DDS definitions and the central server receives a common data model without requiring clients to maintain a common DDS. Instead, each client maintains local ("dedicated") DDSs.

Merely to enhance understanding of embodiments, an example will be provided, but embodiments are not limited to this example.

In this example, there are two Heating, Ventilating and Air Conditioning (HVAC) systems (HVAC1 and HVAC2). Each HVAC system is provided by a different vendor; hence, there are two different data models associated with each of the HVAC systems and the associated target data are different for each of the HVAC systems. That is, implementers have created the different data models.

Figure 2:
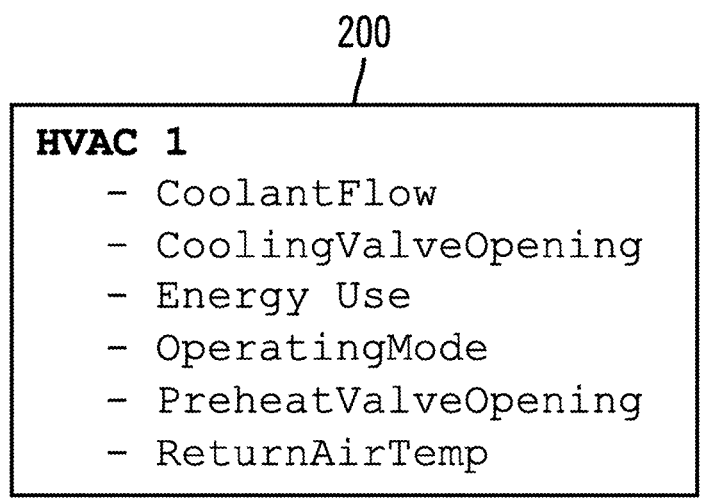
FIG. 2 illustrates an example client-specific data structure for a first Heating, Ventilating and Air Conditioning (HVAC) in accordance with certain embodiments.

FIG. 2 illustrates an example client-specific data structure 200 for a first Heating, Ventilating and Air Conditioning (HVAC) in accordance with certain embodiments. The client-specific data structure may be stored in a database associated with HVAC1 (e.g., client-specific data structure 200 may be stored in a source, such as Source A 118). The client-specific data structure 200 is specific to HVAC1. HVAC1 has been modeled, by its manufacturer, as a single client-specific data structure representing a "system" with properties associated with the system of: CoolantFlow, CoolingValveOpening, Energy Use, Operating Mode, PreHeatValveOpening, and ReturnAirTemp.

Figure 3:
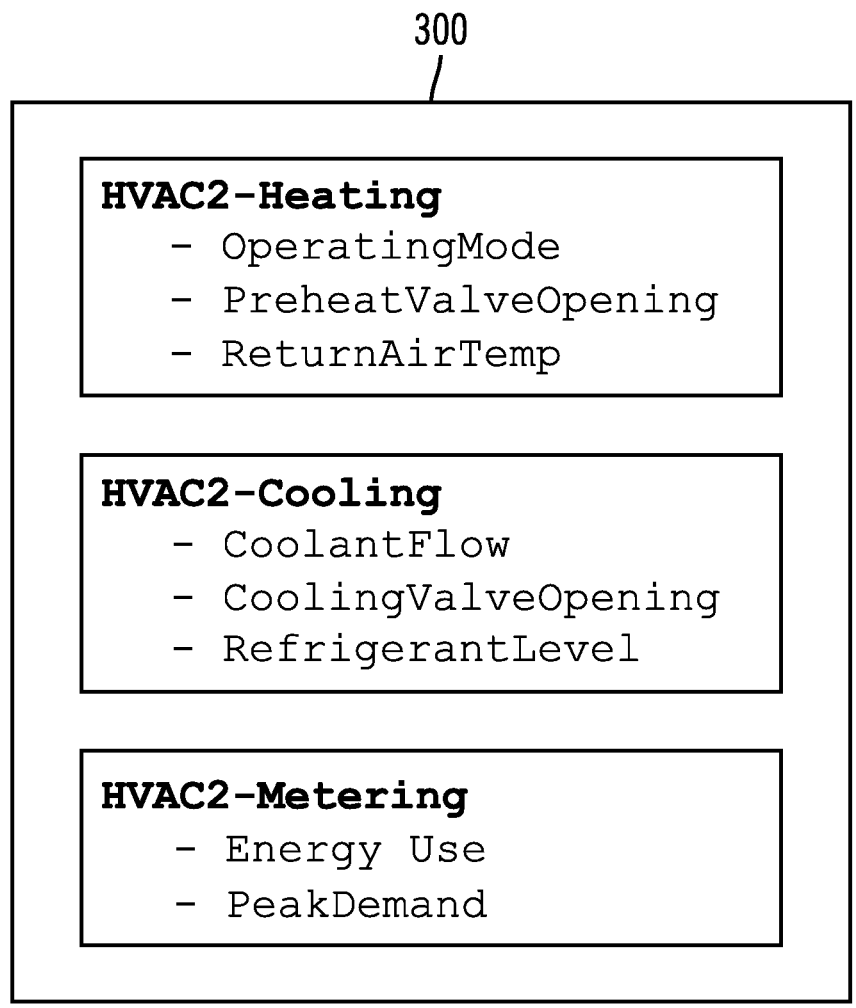
FIG. 3 illustrates example client-specific data structures for a second Heating, Ventilating and Air Conditioning (HVAC) in accordance with certain embodiments.

FIG. 3 illustrates example client-specific data structures 300 for a second Heating, Ventilating and Air Conditioning (HVAC) in accordance with certain embodiments. The client-specific data structures may be stored in a database associated with HVAC2 (client-specific data structure 200 may be stored in a source, such as Source B 138). The client-specific data structures 300 are specific to HVAC2. HVAC2 has been modeled, by its manufacturer, as multiple client-specific data structures, each one representing an operating module of the HVAC system: Heating, Cooling, Metering. Each of these client-specific data structures 300 include properties associated with the module's function. The Heating client-specific data structure has properties of: Operating Mode, PreHeatValveOpening, and ReturnAirTemp. The Cooling client-specific data structure has properties of: CoolantFlow, CoolingValveOpening, and RefigerantLevel. The Metering client-specific data structure has the properties of: Energy Use and PeakDemand.

Embodiments enable implementers to maintain client-specific data structures, while defining a common data structure that is to be used by consuming applications and that complies to the particular data analysis and reporting requirements of the consuming applications. For example, if it turns to be a better fit to have multiple client-specific data structures pointing to specialized modules in an HVAC system, embodiments allow defining those by means of a metadata specification at both HVAC1 and HVAC2. In response to creation of the metadata specification from data structure metadata, embodiments create DDS definitions at the clients. With embodiments, these DDS definitions do not impact how the clients define, understand, and collect data, however, these DDS definitions enable the implementers to have a common data structure at the central server.

Figure 4:
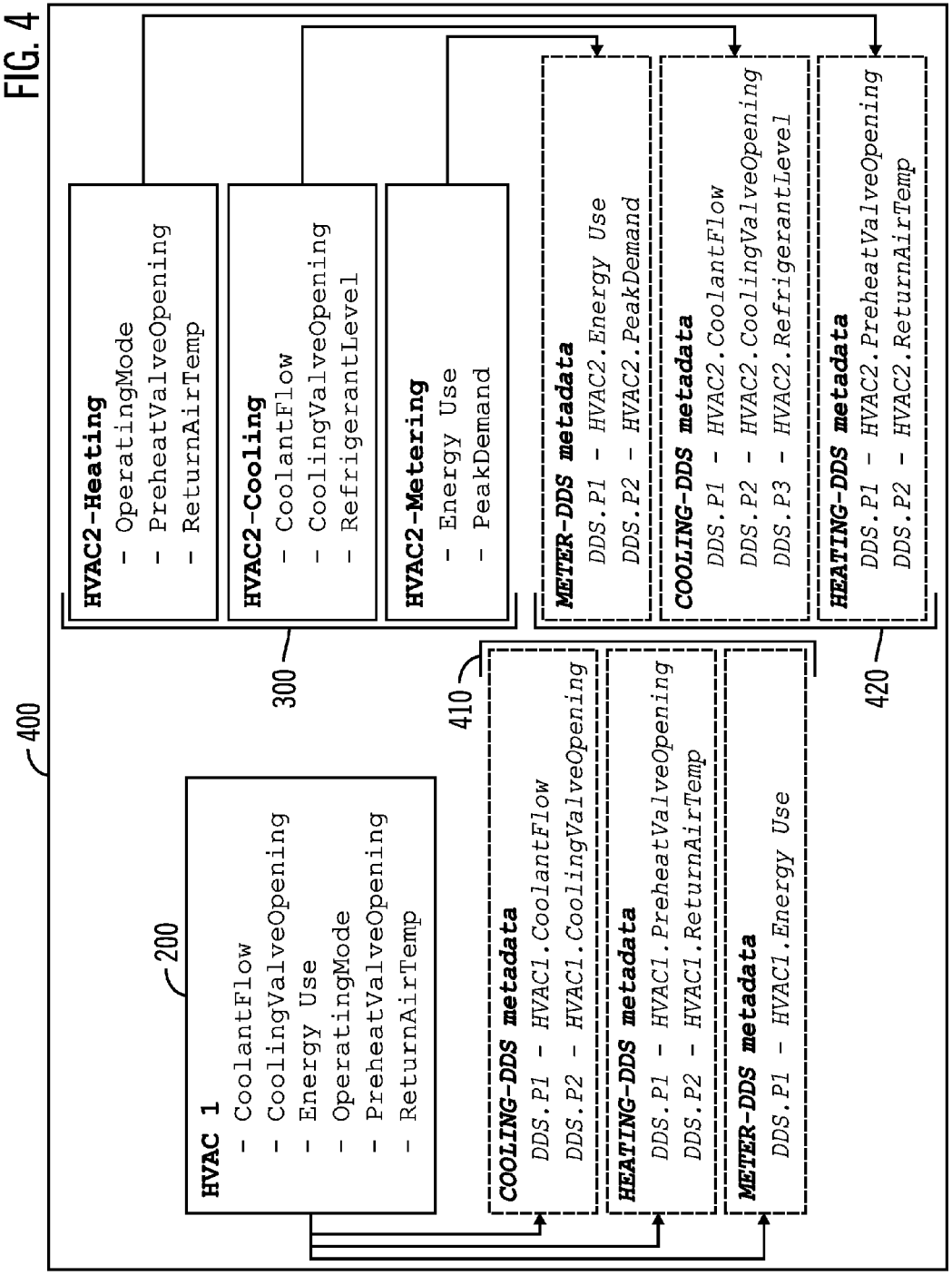
FIG. 4 illustrates Data Driven Structures (DDSs) in accordance with certain embodiments.

FIG. 4 illustrates Data Driven Structures (DDSs) 400 in accordance with certain embodiments. In this example, the metadata specification specifies DDSs for Heating, Cooling and Metering. In this example, for the HVAC2 DDS definitions, additional properties that are only supported by the HVAC2 data structure are provided in the common data structure. Thus, with embodiments, HVAC2 and HVAC1 data structures need not be in sync (i.e., the different client-specific data structures may have different properties). Embodiments define the appropriate metadata specifications in order to propagate client-specific data structure updates to the central server.

Figure 5:
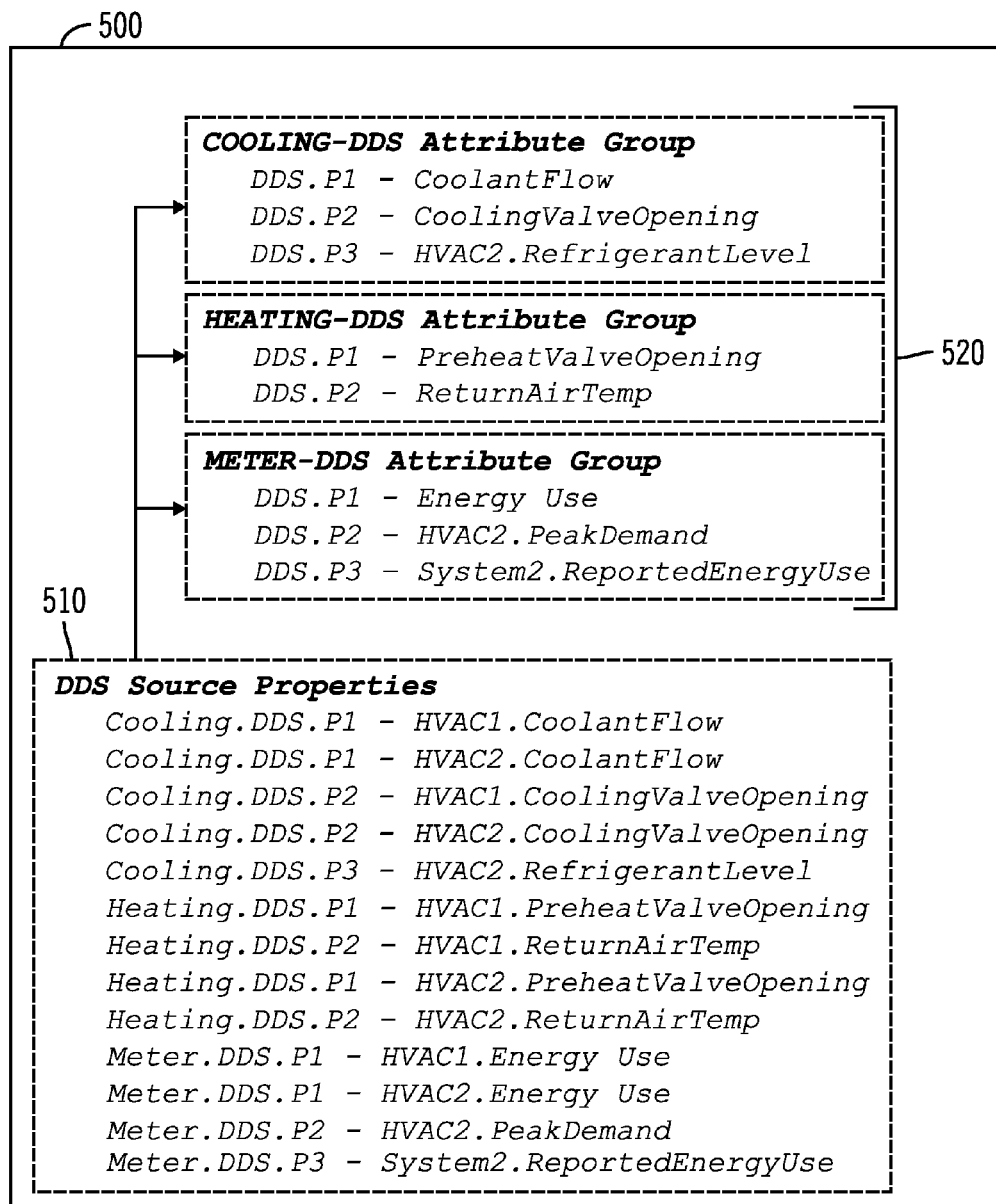
FIG. 5 illustrates source properties and attribute groups in accordance with certain embodiments.

Then, the aggregation process propagates the DDS definitions from each one of the clients to the central server. Source properties identify where each one of the attribute groups is supported, as well as, additional data structure definitions for various data types. FIG. 5 illustrates source properties 510 and attribute groups 520 in accordance with certain embodiments. These source properties 510 and attribute groups 520 were aggregated from the DDSs 410 and 420.

Figure 6B:
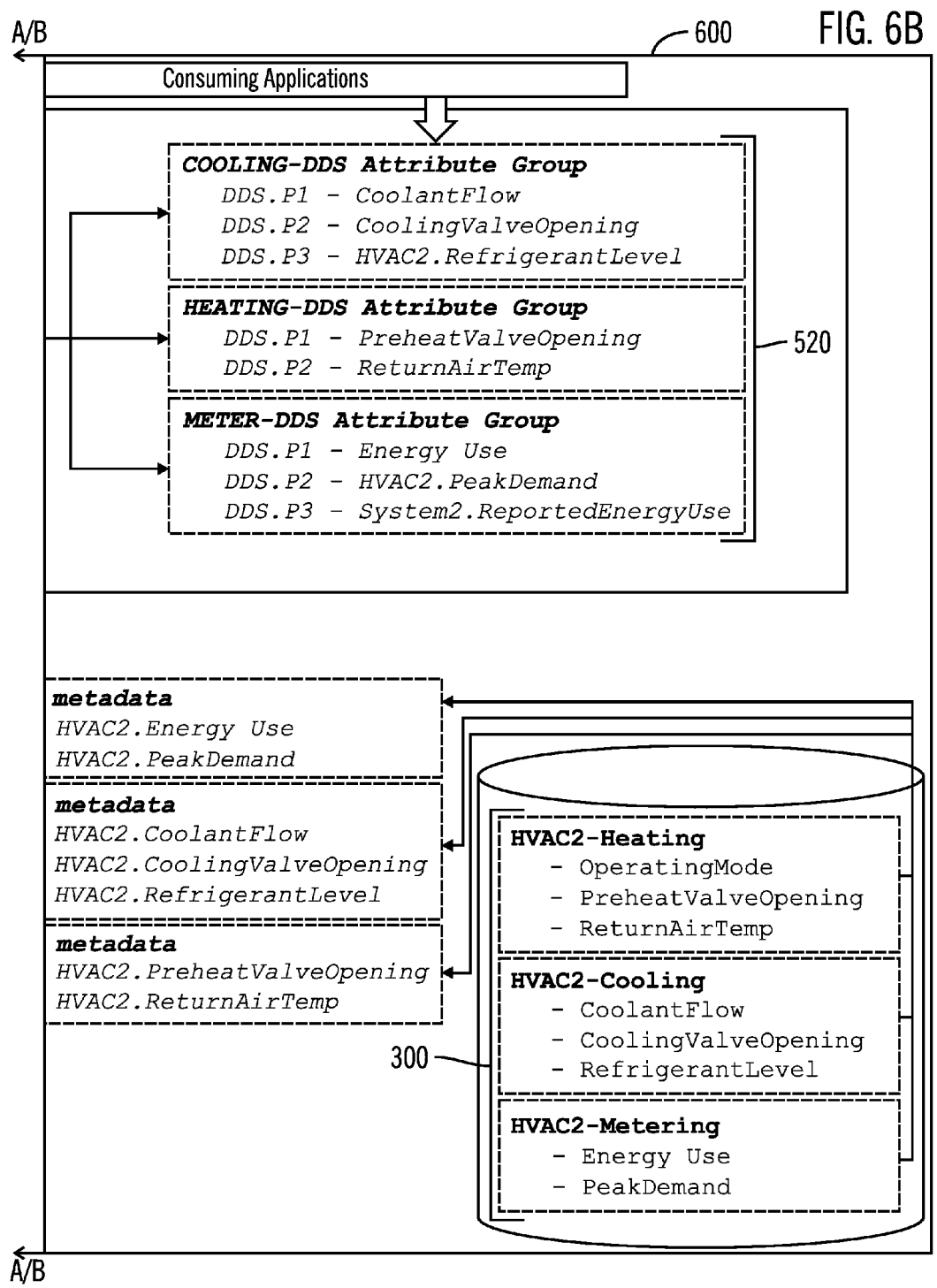

FIGS. 6A and 6B illustrate consuming applications in accordance with certain embodiments. One consuming application may be a Data Mashup that consolidates data based on the common attribute groups and visualizes the data via dashboards, charts, and/or metrics. Another consuming application may be a Data Analysis tool that consumes the common attributes to look for insights on how equipment is operating and infers possible future maintenance and failure issues based on historic data. The consuming applications access the source properties 510 and the attribute groups 520 at the central server. These map back to the DDS 410 (which is generated from the client-specific data structure 200) and DDS 420 (which is generated from the client-specific data structure 300).

Figure 7:
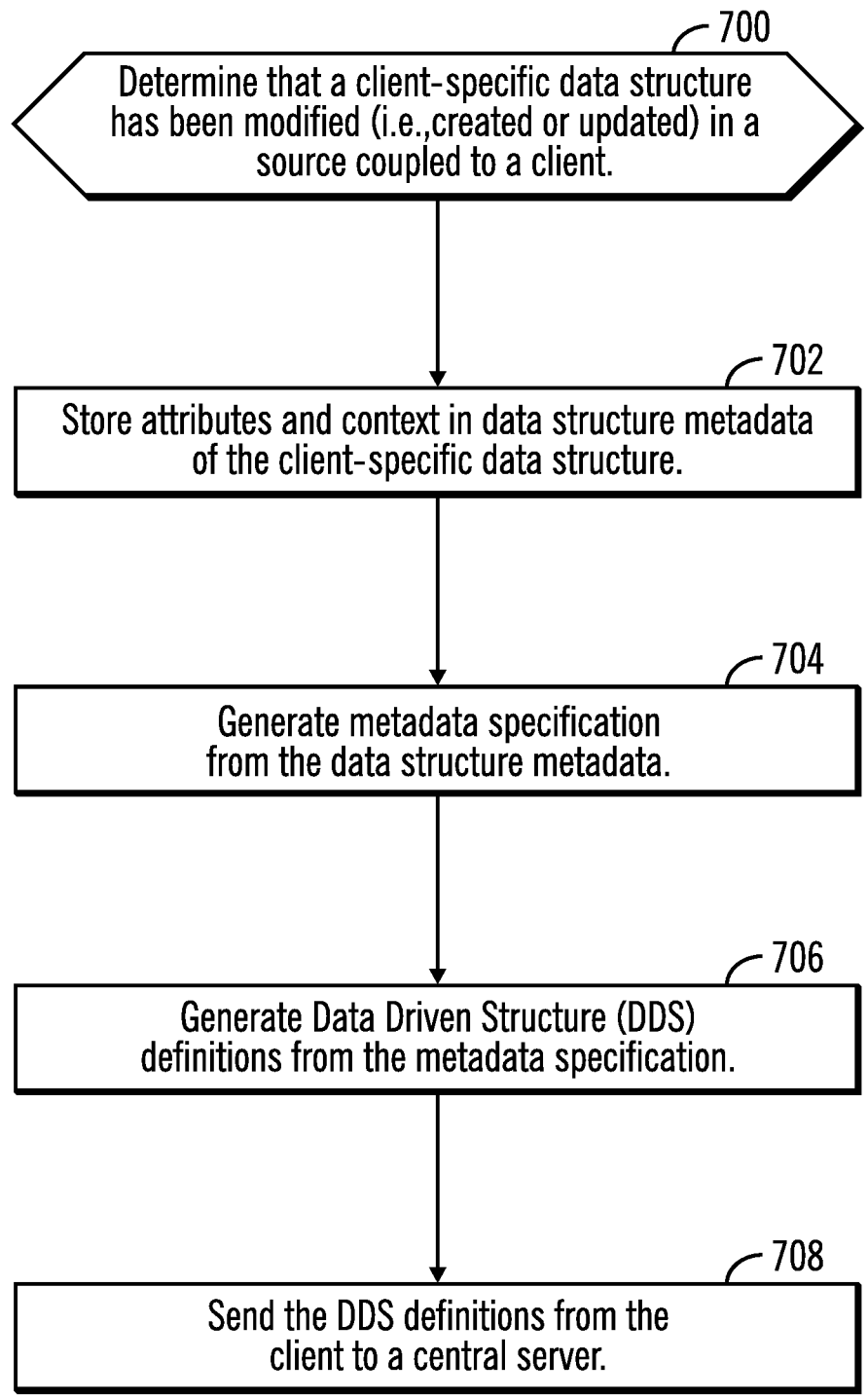
FIG. 7 illustrates, in a flowchart, operations for a data collection process in accordance with certain embodiments.

FIG. 7 illustrates, in a flowchart, operations for a data collection process in accordance with certain embodiments. The processing of FIG. 7 occurs at each client. Control begins at block 700 with the data collection process determining that a client-specific data structure has been modified (i.e., created or updated) in a source coupled to a client. In block 702, the data collection process stores attributes and context in data structure metadata of the client-specific data structure. In block 704, a metadata update process generates a metadata specification from the data structure metadata. In block 706, the metadata update process generates Data Driven Structure (DDS) definitions from the metadata specification. In block 708, the metadata update process sends the DDS definitions from the client to a central server.

Figure 8:
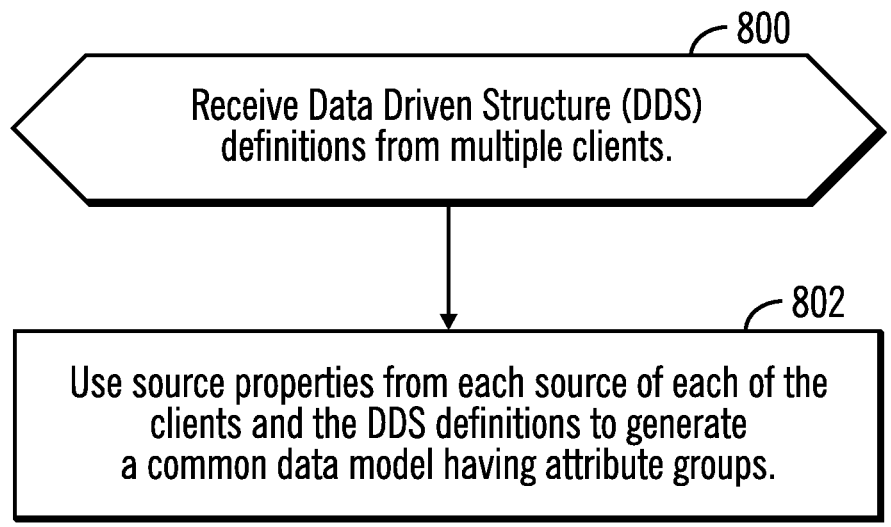
FIG. 8 illustrates, in a flowchart, operations for a data aggregation process in accordance with certain embodiments.

FIG. 8 illustrates, in a flowchart, operations for a data aggregation process in accordance with certain embodiments. Control begins at block 800 with the aggregation process receiving Data Driven Structures (DDSs) definitions from multiple clients. In block 802, the aggregation process uses source properties from each source of each of the clients and the DDS definitions to generate a common data model having attribute groups.

Figure 9:
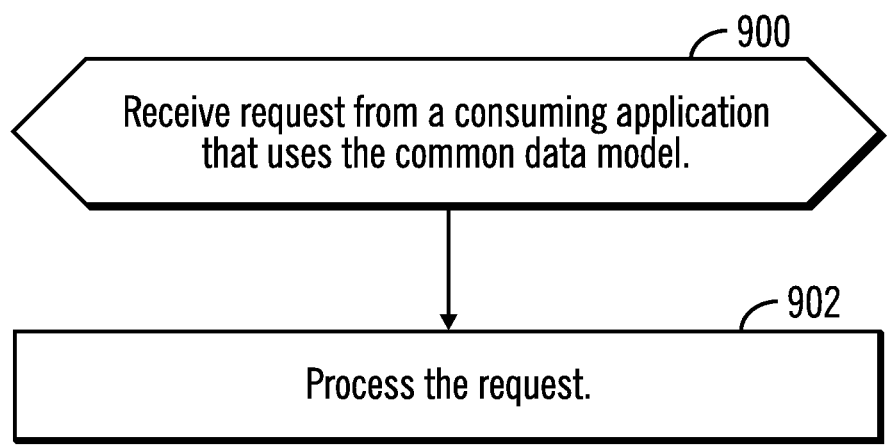
FIG. 9 illustrates, in a flowchart, operations for processing a request using a common data model from a consuming application in accordance with certain embodiments.

FIG. 9 illustrates, in a flowchart, operations for processing a request using a common data model from a consuming application in accordance with certain embodiments. Control begins at block 900 with the central server receiving a request from a consuming application that uses the common data model. In block 902, the central server processes the request. With embodiments, the central server provides an interface from which the consuming applications can consume the common data model. This process will enable consuming applications to request updated versions of the common data model in case they are looking to implement a new version of client-specific data structures. With embodiments, the consuming applications access the common data model at the central server to execute their particular processing. With embodiments, the consuming applications are using the common data model and will not implement attributes that have not been exposed from the client-level components via DDS.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
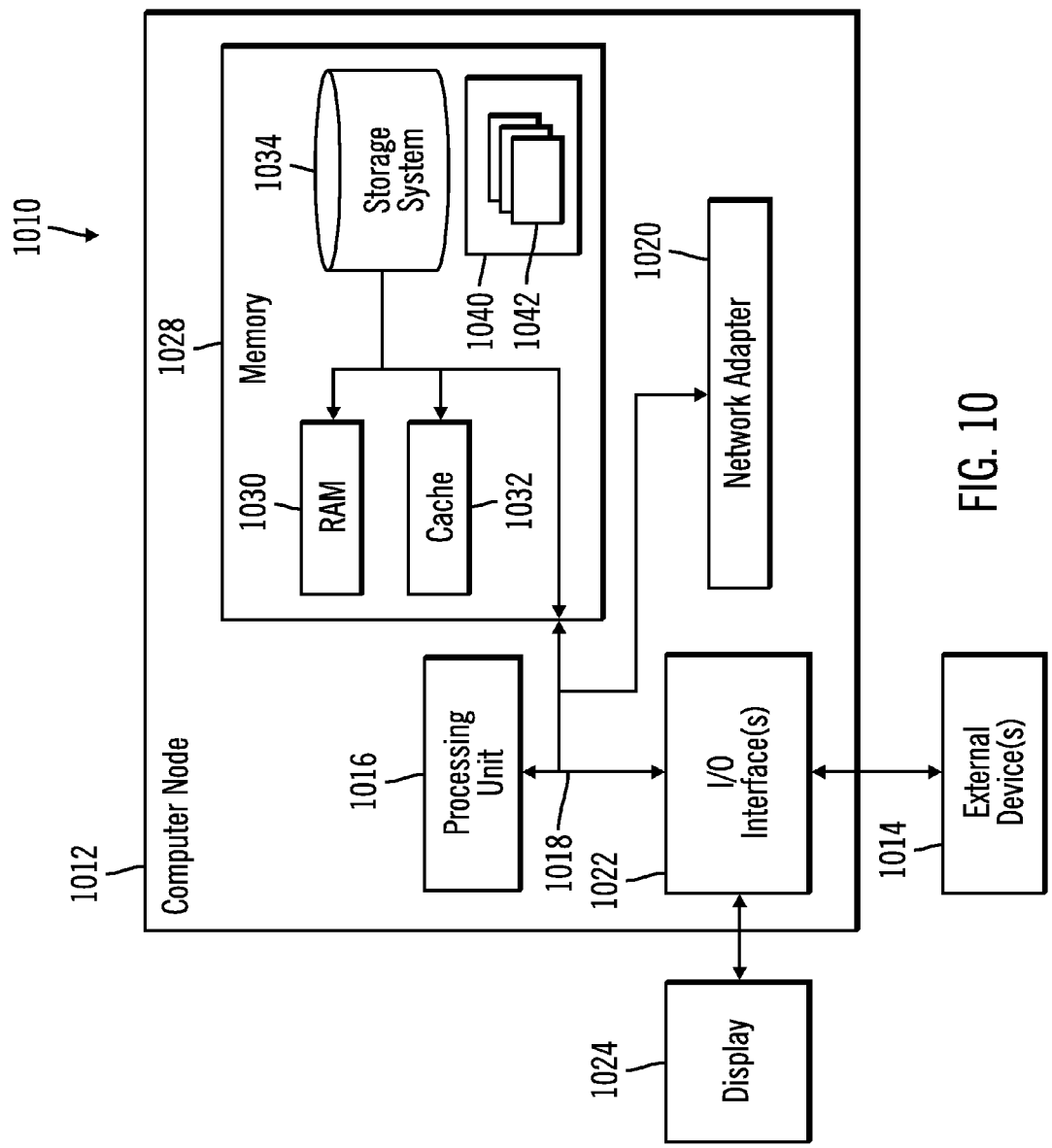
FIG. 10 illustrates a cloud computing node in accordance with certain embodiments.

Referring now to FIG. 10, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
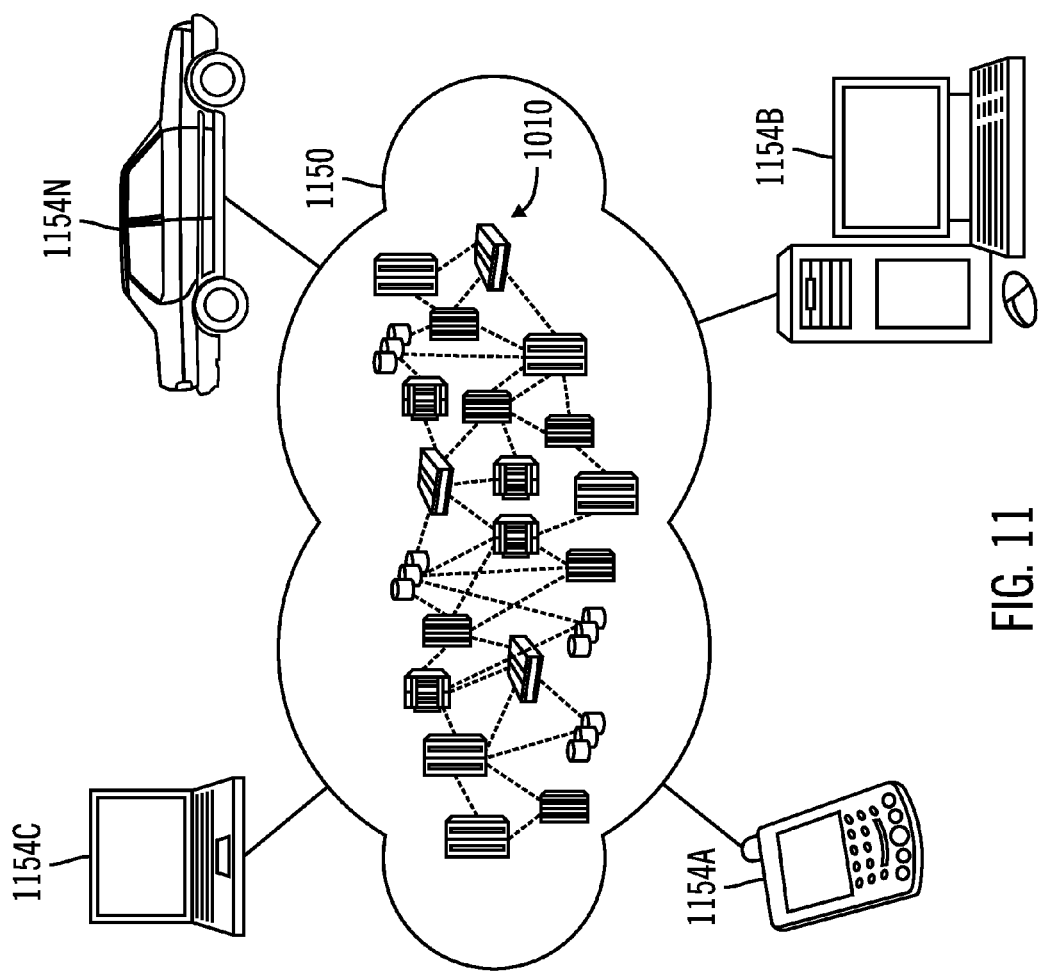
FIG. 11 illustrates a cloud computing environment in accordance with certain embodiments.

Referring now to FIG. 11, illustrative cloud computing environment 1150 is depicted. As shown, cloud computing environment 1150 comprises one or more cloud computing nodes 1010 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1010 and cloud computing environment 1150 can communicate with any type of computerized device over any type of network and/or network addressable connection (e.g., using a web browser).

Figure 12:
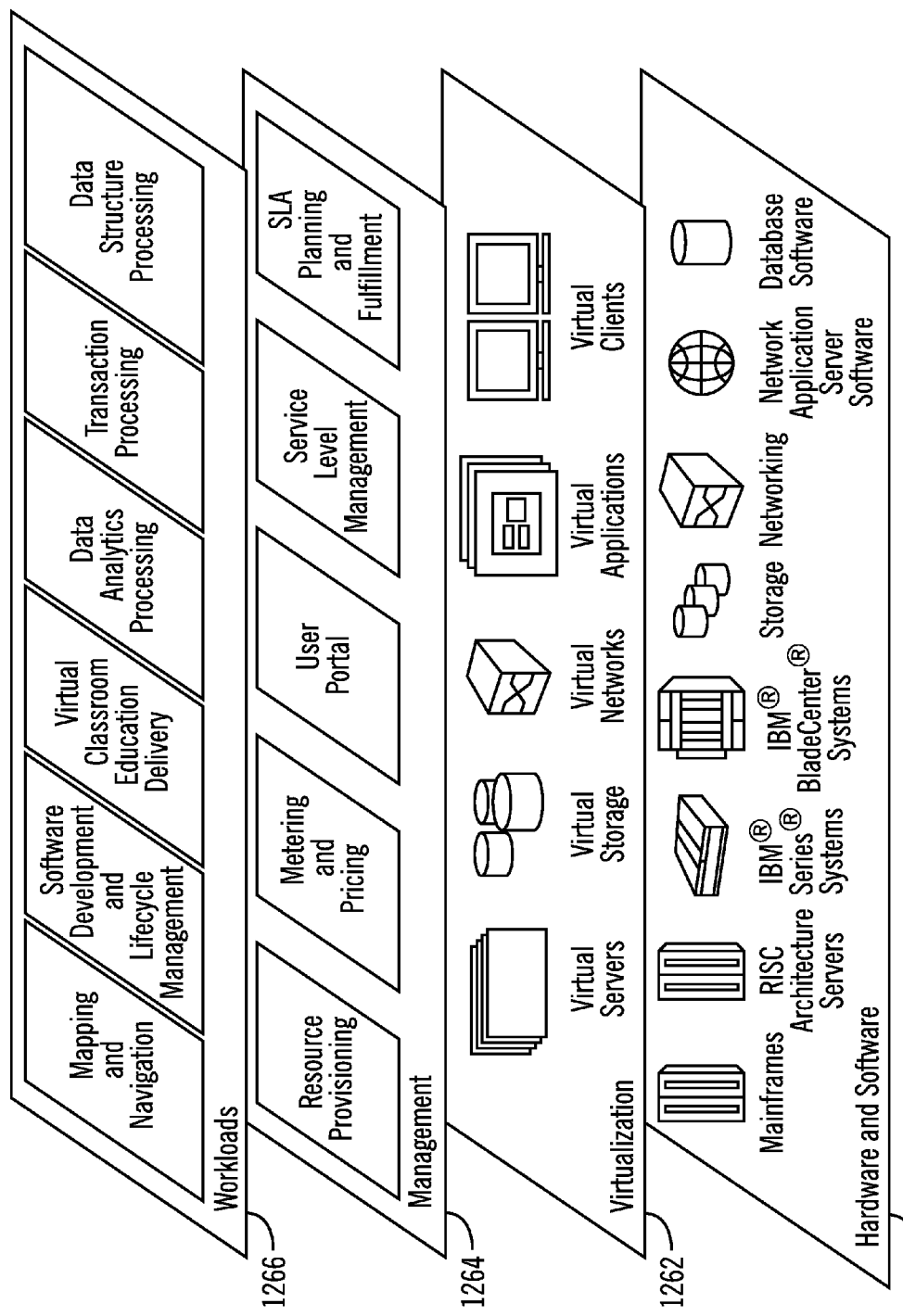
FIG. 12 illustrates abstraction model layers in accordance with certain embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data structure processing.

Thus, in certain embodiments, software or a program, implementing data structure processing in accordance with embodiments described herein, is provided as a service in a cloud environment.

In certain embodiments, client 110, client 130, and/or central server 150 has the architecture of computing node 1010. In certain embodiments, the client 110, client 130, and/or central server 150 is part of a cloud environment. In certain alternative embodiments, client 110, client 130, and/or central server 150 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, using a processor of a computer, data driven structure definitions from each of a plurality of clients, wherein the data driven structure definitions are generated, at each client of the plurality of clients, by:
      determining that a client-specific data structure having attributes has been modified in a source coupled to the client;
      storing the attributes and context of the client-specific data structure in data structure metadata;
      generating a metadata specification from the data structure metadata; and
      generating the data driven structure definitions from the metadata specification, wherein the data driven structure definitions include the attributes of the client-specific data structure and attribute groups;
   aggregating the data driven structure definitions to form a common data model and to form aggregated source properties, wherein the common data model includes aggregated groups of the attributes with an indication of the source of each of the attributes that is not included as an attribute of every client-specific data structure, and wherein the aggregated source properties identify each of the attributes with an aggregated group of the aggregated groups and a source of that attribute; and
   providing the common data model that reflects the modified client-specific data structure of each of the plurality of clients to consuming applications to process data according to a functional context of each of the consuming applications.

2. The method of claim 1, wherein a scheduled job is executed to enable updates to at least one client-specific data structure to be propagated to the common data model.

3. The method of claim 1, wherein the consuming applications include at least one of an Extract Transform and Load (ETL) process, an Enterprise Service Bus (ESB) process, a mashup process, an analytics process, and a query engine.

4. The method of claim 1, wherein the attributes describe at least one of: objects supported by the client-specific data structure, attributes supported by the client-specific data structure, data types supported by the client-specific data structure, and a processing context for any objects and any attributes, and wherein any objects and any attributes have associated conditions that make propagation of the client-specific data structure conditional.

5. The method of claim 1, wherein a Software as a Service (SaaS) is configured to perform method operations.

6. A computer program product, the computer program product comprising a computer readable storage medium having program code embodied therewith, the program code executable by at least one processor to perform:
- receiving data driven structure definitions from each of a plurality of clients, wherein the data driven structure definitions are generated, at each client of the plurality of clients, by:
  - determining that a client-specific data structure having attributes has been modified in a source coupled to the client;
  - storing the attributes and context of the client-specific data structure in data structure metadata;
  - generating a metadata specification from the data structure metadata; and
  - generating the data driven structure definitions from the metadata specification, wherein the data driven structure definitions include the attributes of the client-specific data structure and attribute groups;
- aggregating the data driven structure definitions to form a common data model and to form aggregated source properties, wherein the common data model includes aggregated groups of the attributes with an indication of the source of each of the attributes that is not included as an attribute of every client-specific data structure, and wherein the aggregated source properties identify each of the attributes with an aggregated group of the aggregated groups and a source of that attribute; and
- providing the common data model that reflects the modified client-specific data structure of each of the plurality of clients to consuming applications to process data according to a functional context of each of the consuming applications.

7. The computer program product of claim 6, wherein a scheduled job is executed to enable updates to at least one client-specific data structure to be propagated to the common data model.

8. The computer program product of claim 6, wherein the consuming applications include at least one of an Extract Transform and Load (ETL) process, an Enterprise Service Bus (ESB) process, a mashup process, an analytics process, and a query engine.

9. The computer program product of claim 6, wherein the attributes describe at least one of: objects supported by the client-specific data structure, attributes supported by the client-specific data structure, data types supported by the client-specific data structure, and a processing context for any objects and any attributes, and wherein any objects and any attributes have associated conditions that make propagation of the client-specific data structure conditional.

10. The computer program product of claim 6, wherein a Software as a Service (SaaS) is configured to perform computer program product operations.

11. A computer system, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more memories, to perform:
- receiving data driven structure definitions from each of a plurality of clients, wherein the data driven structure definitions are generated, at each client of the plurality of clients, by:
  - determining that a client-specific data structure having attributes has been modified in a source coupled to the client;
  - storing the attributes and context of the client-specific data structure in data structure metadata;
  - generating a metadata specification from the data structure metadata; and
  - generating the data driven structure definitions from the metadata specification, wherein the data driven structure definitions include the attributes of the client-specific data structure and attribute groups;
- aggregating the data driven structure definitions to form a common data model and to form aggregated source properties, wherein the common data model includes aggregated groups of the attributes with an indication of the source of each of the attributes that is not included as an attribute of every client-specific data structure, and wherein the aggregated source properties identify each of the attributes with an aggregated group of the aggregated groups and a source of that attribute; and
- providing the common data model that reflects the modified client-specific data structure of each of the plurality of clients to consuming applications to process data according to a functional context of each of the consuming applications.

12. The computer system of claim 11, wherein a scheduled job is executed to enable updates to at least one client-specific data structure to be propagated to the common data model.

13. The computer system of claim 11, wherein the consuming applications include at least one of an Extract Transform and Load (ETL) process, an Enterprise Service Bus (ESB) process, a mashup process, an analytics process, and a query engine.

14. The computer system of claim 11, wherein a Software as a Service (SaaS) is configured to perform computer system operations.

15. The computer system of claim 11, wherein the attributes describe at least one of: objects supported by the client-specific data structure, attributes supported by the client-specific data structure, data types supported by the client-specific data structure, and a processing context for any objects and any attributes, and wherein any objects and any attributes have associated conditions that make propagation of the client-specific data structure conditional.

* * * * *